Jan. 26, 1965    I. A. LEO    3,167,134
POWERED MOLDBOARD PLOW
Filed Jan. 23, 1963    3 Sheets-Sheet 1

INVENTOR
IVAN A. LEO
BY
Dick, Zarley & Henderson
ATTORNEYS

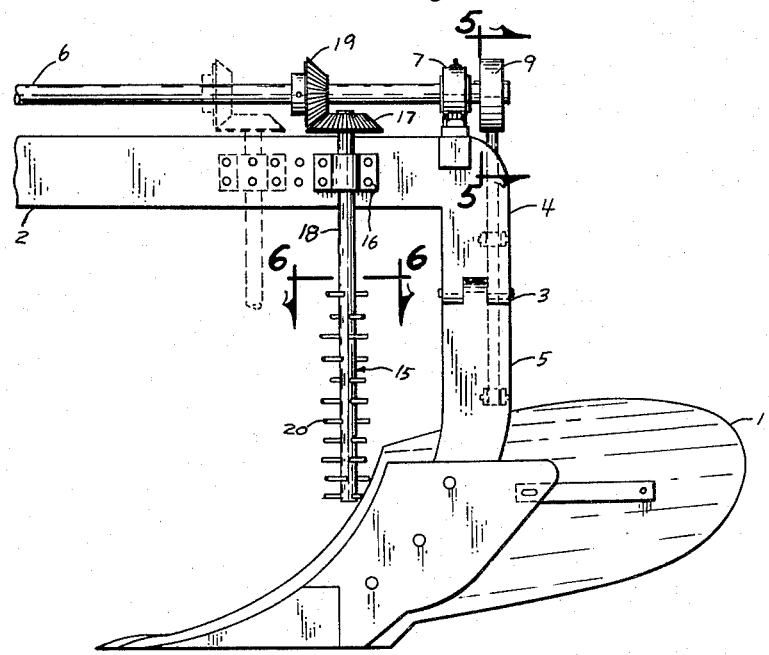
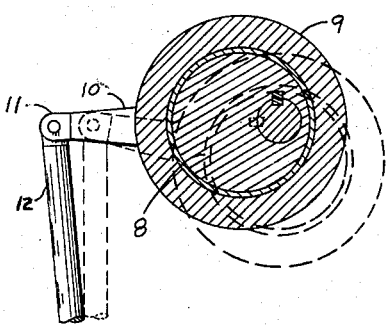
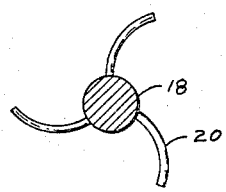

Jan. 26, 1965  I. A. LEO  3,167,134
POWERED MOLDBOARD PLOW
Filed Jan. 23, 1963  3 Sheets-Sheet 3
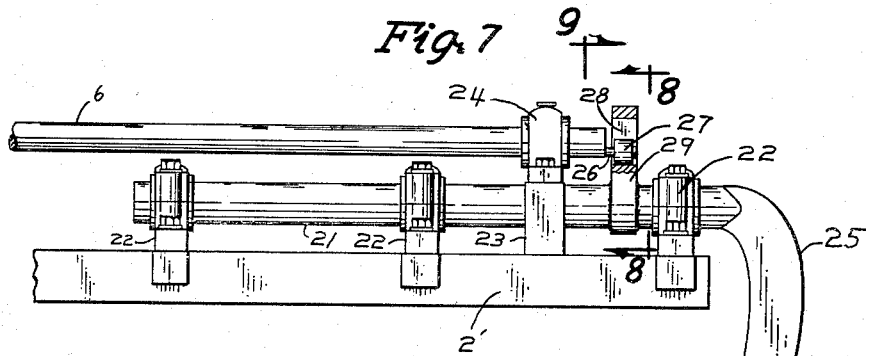
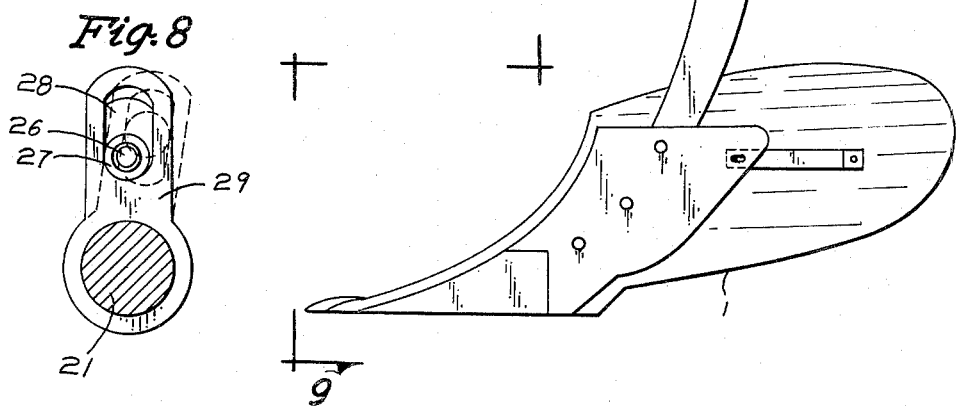
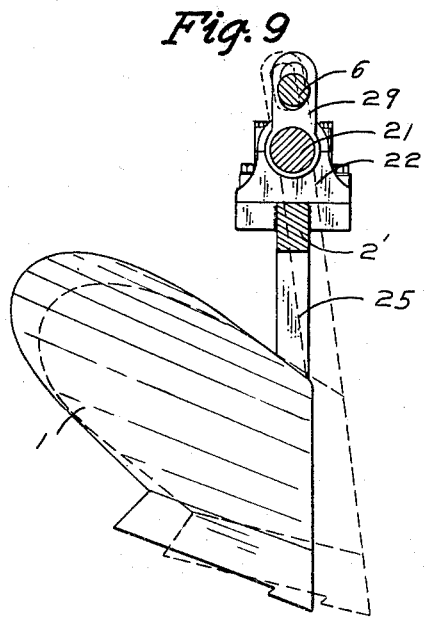
INVENTOR
IVAN A. LEO
BY
Dick, Zarley & Henderson
ATTORNEYS

United States Patent Office 3,167,134
Patented Jan. 26, 1965

3,167,134
POWERED MOLDBOARD PLOW
Ivan Andrew Leo, Yale, Iowa
Filed Jan. 23, 1963, Ser. No. 253,316
2 Claims. (Cl. 172—40)

This invention relates to a powered moldboard plow and particularly means for powered performance of specified operation of parts, as set forth herein, of a powered moldboard plow, as it moves through and over the soil. Heretofore, all moldboard type plows have worked the soil by the plow bottom moving straightforward through the soil, a tractor having considerable power and traction capability is required and can only operate under conditions where adequate traction between the wheels of the tractor and the ground can be maintained. An additional problem encountered by the ordinary moldboard plow is the gathering and accumulation of debris and residue material in front of and about the coulter wheel and its mounting shank, and similarly, the plow bottom and its mounting shank or beam. Under certain soil conditions, the moldboard and share of the plow bottom will not scour properly. Soil compaction is agriculturally recognized as a problem in soil tillage and plant growth. Related to the large power and traction requirements necessary by the ordinary moldboard plow is the additional problem of increased soil compaction by larger and heavier tractors, which is an undesirable factor in soil tillage and plant growth. Similarly related is the difficulty encountered by the ordinary moldboard plow share in its straightforward severing of tough, tendon-like vegetation roots.

Therefore it is one of the objects of this invention to provide a moldboard plow implement that will move laterally as well as more easily forwardly through the soil, reducing tractor traction requirements.

Another object of this invention is to provide a moldboard plow implement that will more effectively cause debris and trash to continuously move through the plow to the moldboard of the ploy bottom, thereby eliminating collection and accumulation of such material among parts of the plow.

Another object of this invention is to provide improvements to moldboard type plows which are economical to manufacture and durable in nature, and effective in their agricultural purpose.

Another object of this invention is to provide a moldboard type plow having reciprocal plow share and bottom lateral movement as a plow moves forwardly through the soil, such action effectively slicing or shearing the moved soil and roots of crops and forage vegetation from the base soil with reduced forward power requirements.

Another object of this invention is to provide a power rotated progressor located on the moldboard plow to prevent lodging of debris and trash on or about the plow frame and coulter wheel.

Another object of this invention is to provide a reciprocating plow moldboard and share which may be easily substituted for the conventional plow moldboard and share on the standard plow.

A further object of this invention is to provide a moldboard plow which will require less power for its operation than the ordinary plow capable of cutting the same width and depth swath through the soil.

Another object of this invention is to provide a reciprocating plow moldboard and share which may be operated from an independent power supply mounted on the plow or through the power takeoff drive carried by the ordinary tractor.

Another object of this invention is to provide rotating power to power such traction wheels of the plow as may be provided in forward plow propelling assistance to the traction wheels of the tractor.

Another object of this invention is to provide a moldboard plow capable of slicing or shearing all types of soil and roots of crop and forage vegetation more easily.

Various other objects and advantages will appear from the following description of the several embodiments of the invention and the novel features will be particularly pointed out hereinafter in connection with the appended claims and illustrated in the accompanying drawings, in which:

FIG. 4 is a side elevation view of the invention as illustrated in FIG. 1;

FIG. 5 is a cross-sectional view of the eccentric drive mechanism illustrated in FIG. 4 taken along line 5—5;

FIG. 6 is a cross-sectional view of the rotary progressor illustrated in FIG. 4 taken along line 6—6;

FIG. 7 is a side elevational view of a second embodiment of the eccentric drive mechanism for giving reciprocal movement to the plow moldboard;

FIG. 8 is a cross-sectional view of the eccentric drive mechanism of FIG. 7 taken along line 8—8 of FIG. 7; and FIG. 9 is a cross-sectional view from the opposite end of that shown in FIG. 8 of the eccentric drive mechanism illustrated in FIG. 7.

Figure 1:
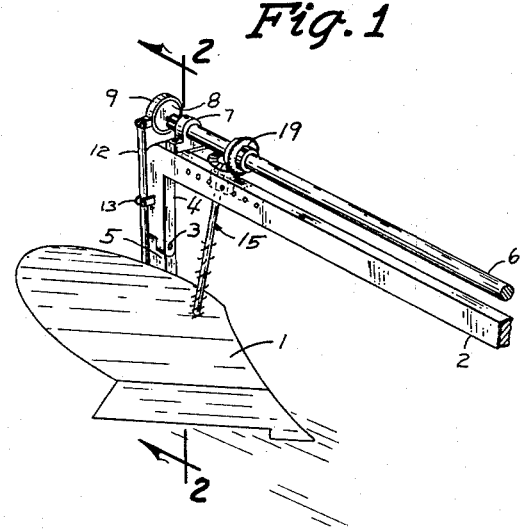
FIG. 1 is a perspective view of one embodiment of the reciprocating plow moldboard in connection with a rotary progressor.

The invention will now be described in detail by referring to FIG. 1 wherein an implement in the form of a conventional moldboard 1 is rotatably attached to the plow frame 2 through a pivotal joint 3. The plow frame 2 has a longitudinal elongated bar portion which has a vertical portion 4 extending at right angles thereto. The vertical portion 4 is pivotally connected at joint 3 to an elongated bar member 5 fixedly attached to the moldboard 1. A drive shaft 6 is mounted on bearing 7 vertically above and attached to plow frame 2. Drive shaft 6 is powered by any suitable means such as the power take-off of a tractor or an auxiliary engine.

An eccentric disk 8 is fixedly attached to one end of the drive shaft 6 opposite the power supply. The eccentric disk 8 rotates inside the race 9 as is best illustrated in FIG. 5 to communicate reciprocal movement to the eccentric bar 10 rigidly mounted on the side of the race 9 as the eccentric disk 8 is rotated. Eccentric bar 10 has mounted on its outer end a clevis 11 which is pivotally connected to a rocker arm 12. The rocker arm 12 is pivotally secured to the vertical portion 4 of the plow frame by a U-shaped bracket 13. A second U-shaped bracket 14 pivotally connects the rocker arm 12 to the elongated bar member 5 which carriers the plow moldboard 1.

Figure 2:
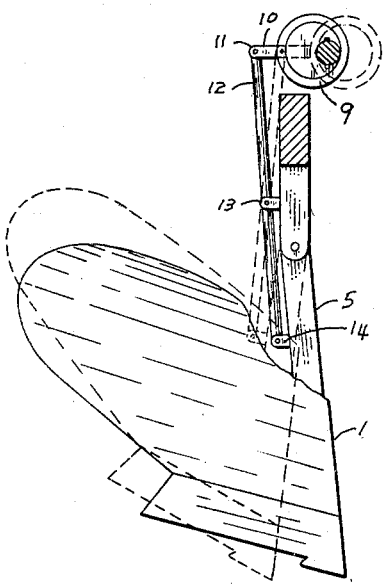
FIG. 2 is a cross-sectional elevation view of the embodiment illustrated in FIG. 1 taken along line 2—2.
Figure 3:
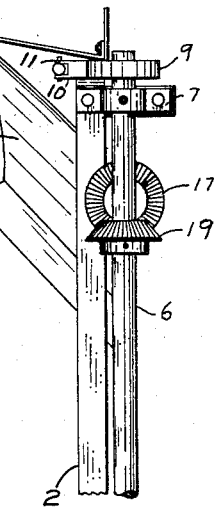
FIG. 3 is a top plan view of the embodiment illustrated in FIG. 1.

As is illustrated in FIGS. 2 and 5, lateral reciprocal movement is transmitted through the rocker arm 12 by rotation of the drive shaft 6 connected to the eccentric race 9 in turn connected to the eccentric bar 10.

A rotary progressor 15 is rotatably mounted by a strap bearing 16 to the longitudinal elongated bar portion of the plow frame. At its upper end above the plow frame as seen in FIG. 4 it is connected to the drive shaft 6 by a beveled spur gear transmission comprising a beveled spur gear 17 on a vertical shaft 18 of the progressor 15 and a second beveled spur gear 19 mounted on the drive shaft 6. The broken lines in FIG. 4 illustrate that the rotary progressor may be selectively mounted along the longitudinal elongated bar portion of the plow frame at any desired position forwardly of the plow moldboard. FIG. 6 illustrates in cross-sectional form the teeth arrangement of which the rotary progressor is comprised. It includes curved teeth 20 uniformly affixed to the shaft 18 and projecting radially therefrom.

In the alternative embodiment of this invention illustrated in FIG. 7, a beam 21 is mounted atop and parallel to the plow frame 2' by bearings 22 and 23. Bearing 23 mounted on plow frame 2' has mounted on its upper end a drive shaft bearing 24 for rotatably supporting drive shaft 6 connected to the power take-off of a tractor or other suitable power source. Beam 21 terminates at its outer end in a vertically curved shank member 25. A moldboard is fixedly attached to the lower end of the shank member 25, as is illustrated in FIG. 7. The outer end of drive shaft 6 has an eccentric connecting pin 26 with a longitudinal axis parallel to the longitudinal axis of the drive shaft. A roller 27 is mounted on connecting pin 26. The outer end of pin 26 is then flanged to retain the roller 27 against outer longitudinal movement. As the drive shaft 6 rotates, the eccentrically mounted roller 27 on pin 26 will move within an elongated opening 28. Elongated opening 28 is formed in the outer end portion of a rocker bar 29 and positioned in a vertical plane. The lower end of the rocker bar is fixedly attached to beam 21. As the drive shaft 6 rotates, the eccentrically mounted roller 27 connected to the connecting pin 26 will cause the rocker bar to move laterally in turn rotating beam 21 which in turn will reciprocate the moldboard plow share as is illustrated in FIG. 9.

Through a conventional mechanical power drive arrangement, rotative power, as provided to or for this new and useful improvement in a powered moldboard plow, by a tractor power take-off, and/or auxiliary rotative power source mounted on said plow, is also available in forwardly propelling of any or all soil contact traction wheels, and/or wheels bearing track laying type traction tracks of said plow, thereby reducing traction requirements of the tractor.

In either of the embodiments as illustrated in FIGS. 1 through 6 and FIGS. 7 through 9, respectively, the moldboard 1 will be reciprocally moved from side to side as is best illustrated in FIGS. 2 and 9 to effect slicing or shearing of the soil and roots of crop or forage vegetation.

It is contemplated that additional plow bottoms and progressors may be added to the plow frame as desired. Furthermore, this system may be duplicated with moldboards moving simultaneously in opposite directions thereby improving the machine stability in the case of an even numbered bottom plow, e.g., a two-bottom, four-bottom or six-bottom plow.

It will be understood that various changes in the details, materials, steps and arrangements of parts, which have been herein described and illustrated in order to explain the nature of the invention, may be made by those skilled in the art within the principle and scope of the invention as expressed in the appended claims.

Some changes may be made in the construction and arrangement of my powered moldboard plow without departing from the real spirit and purpose of my invention, and it is intended to cover by my claims, any modified forms of structure or use of mechanical equivalents which may be reasonably included within their scope.

I claim:

1. In a powered moldboard plow,
a frame having a horizontal portion and a vertical portion extending downwardly from one end thereof,
an elongated bar member pivotally secured to the lower end of said vertical portion,
said elongated bar pivoting in a transverse plane to the longitudinal axis of said horizontal portion,
a moldboard rigidly secured to the lower end of said elongated bar member,
a drive shaft rotatably mounted on said horizontal portion and connected at one end to a power means,
a rocker arm pivotally connected at the lower end to said moldboard,
said rocker arm pivotally mounted on said vertical portion intermediate its length,
a race pivotally connected to the upper end of said rocker arm,
and an eccentric disk mounted on the other end of said drive shaft which is rotatably mounted in said race.

2. The structure of claim 1 wherein a rotary progressor is rotatably mounted on said frame in a vertical plane and in a spaced relation to said vertical portion of said frame, said rotary progressor including an elongated shaft having a plurality of curved arcuate shaped finger members extending outwardly therefrom, and a means for connecting said drive shaft and said rotary progressor.

References Cited by the Examiner
UNITED STATES PATENTS

| 234,008 | 11/80 | Edey | 172—66 |
| 303,050 | 8/84 | Roberts | 172—107 |
| 448,770 | 3/91 | Arrington | 172—40 |
| 2,638,042 | 5/53 | Barstow et al. | 172—66 X |
| 2,706,439 | 4/55 | Ellingboe | 172—101 X |
| 2,871,955 | 2/59 | Hasleau | 172—63 |

FOREIGN PATENTS

| 767,411 | 5/34 | France. |
| 659,252 | 4/38 | Germany. |
| 896,792 | 5/62 | Great Britain. |
| 500,763 | 11/54 | Italy. |

ABRAHAM G. STONE, *Primary Examiner.*